(12) United States Patent
Hadas et al.

(10) Patent No.: US 10,417,034 B2
(45) Date of Patent: Sep. 17, 2019

(54) GRADUAL CREATION PROCESS OF SERVER VIRTUAL MACHINES

(71) Applicant: Red Hat Israel, Ltd., Ra'anana (IL)

(72) Inventors: Arik Hadas, Herzliya (IL); Maor Lipchuk, Tel-Aviv (IL)

(73) Assignee: Red Hat Israel, Ltd., Ra'anana (IL)

( * ) Notice: Subject to any disclaimer, the term of this patent is extended or adjusted under 35 U.S.C. 154(b) by 82 days.

(21) Appl. No.: 15/845,249

(22) Filed: Dec. 18, 2017

(65) Prior Publication Data
US 2019/0188019 A1 Jun. 20, 2019

(51) Int. Cl.
*G06F 9/44* (2018.01)
*G06F 9/455* (2018.01)

(52) U.S. Cl.
CPC ............ *G06F 9/45558* (2013.01); *G06F 2009/45562* (2013.01)

(58) Field of Classification Search
CPC ....................................................... G06F 9/44
See application file for complete search history.

(56) References Cited

U.S. PATENT DOCUMENTS

| 8,046,550 | B2 * | 10/2011 | Feathergill | G06F 11/1466 711/162 |
| 8,732,290 | B2 | 5/2014 | Goswami et al. | |
| 8,943,056 | B2 | 1/2015 | Baum et al. | |
| 9,135,045 | B2 | 9/2015 | De Pradipta et al. | |
| 9,148,428 | B1 | 9/2015 | Banga et al. | |
| 9,513,949 | B2 | 12/2016 | Beveridge et al. | |
| 2011/0022694 | A1 | 1/2011 | Dalal et al. | |
| 2014/0149793 | A1 * | 5/2014 | Zaslavsky | G06F 9/45533 714/19 |
| 2016/0055017 | A1 * | 2/2016 | Beveridge | G06F 9/45558 718/1 |
| 2016/0140343 | A1 * | 5/2016 | Novak | G06F 21/575 713/2 |

FOREIGN PATENT DOCUMENTS

CN 104360892 A 2/2015

* cited by examiner

*Primary Examiner* — Jae U Jeon
(74) *Attorney, Agent, or Firm* — K&L Gates LLP

(57) ABSTRACT

An example method for the gradual creation process of server virtual machines includes a virtualization manager locking a virtual machine template, saving a configuration of a virtual machine, locking the virtual machine, and directing a worker host to create a volume. The worker host creates the volume, and the virtualization manager unlocks the virtual machine. A destination host executes the virtual machine, and the worker host merges the volume with a disk of the virtual machine template.

19 Claims, 9 Drawing Sheets

GRADUAL CREATION PROCESS OF SERVER VIRTUAL MACHINES

BACKGROUND

Computer systems may employ isolated guests such as virtual machines that communicate with physical devices. A virtual machine (VM) is a software implementation of a computer that executes programs in a way similar to a physical machine. A virtual machine may include a virtual disk which may include one or more volumes. The isolated guest may share underlying physical hardware resources between different components of the computer system. Virtualized systems allow multiple isolated guests to run on a single physical host, which allows flexibility and scalability offered by running services or applications on the isolated guests. For example, an isolated guest may perform tasks associated with the functions of physical devices or other resources on the computer system by sending and receiving data over a network.

SUMMARY

The present disclosure provides new and innovative methods and systems for gradual creation of server virtual machines. An example method includes a virtualization manager locking a virtual machine template, saving a configuration of a virtual machine, locking the virtual machine, and directing a worker host to create a volume. The worker host creates the volume, and the virtualization manager unlocks the virtual machine. A destination host executes the virtual machine, and the worker host merges the volume with a disk of the virtual machine template.

An example system includes one or more storage locations and a virtualization manager. The virtualization manager locks a virtual machine template, saves a configuration of a virtual machine, locks the virtual machine, directs a worker host to create a volume and unlocks the virtual machine. A destination host executes the virtual machine. A worker host creates the volume, and merges the volume and a disk of the virtual machine template.

An example method includes creating virtual disks, wherein each disk includes volumes. The cloning process of virtual disk templates is delayed, and virtual machines using the virtual disks are executed while the cloning process is delayed. After the virtual machines have executed for a period of time, the cloning process of the virtual disk templates is executed.

Additional features and advantages of the disclosed methods and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Virtual machines are typically created from virtual machine templates that are installed with an operating system and optionally some set of applications. By using a virtual machine template, administrators may not need to install each virtual machine separately from scratch, and this may help to accelerate virtual machine provisioning. It may be desirable, for a number of reasons, to create a virtual machine from a template in different storage locations. For example, the number of storage devices utilized may be minimized in order to reduce electricity usage; virtual disks in a system may be split between as many storage devices as possible in order to be more fault tolerant; etc.

Typically, there are two common approaches for creating a virtual machine from a virtual machine template. One exemplary way is by creating a virtual machine in a thin-provisioning manner, where the virtual machine disks will be comprised of volumes on top of a template disk. Thin provisioning is a fast operation as no data is being copied, but imposes performance degradation due to the overhead of having multiple volumes per disk. This approach is typically intended for desktop virtual machines. In an alternative example, the virtual machine disk can be created as a clone of a template disk, where each virtual disk is a complete copy of a template disk with no additional volumes. In this example, cloning a template's disk is a slow operation as it involves copying entire disks, but produces virtual machines that perform better due to the virtual machine disks have fewer volumes. For example, if a template exists that has 20 gigabytes of data, all 20 gigabytes must be copied and stored. This approach is typically intended for server virtual machines which typically requires higher performance than desktop virtual machines. It would be desirable to create a server virtual machine quickly using thin provisioning that also complies with the higher performance requirements needed from server virtual machines.

The present disclosure provides a possible solution to this problem. For example, a virtualization manager will control the operation and direct a worker host to quickly create a volume on top of a template disk that will serve as the virtual disk of the virtual machine to be created. Upon the creation of this volume, users may begin using the virtual machine. Any differences between the template disk and the volume are stored into the volume. After a delayed period of time, the worker host merges the volume and the template disk to create the server virtual machine, in order to provide better performance characteristics by having fewer volumes. In this example, the creation of the server virtual machine is much faster, as initially no data needs to be copied over in order to use the virtual machine, and the delay in merger allows the merger to occur at different times and based on different factors, as described in further detail below.

Figure 1:
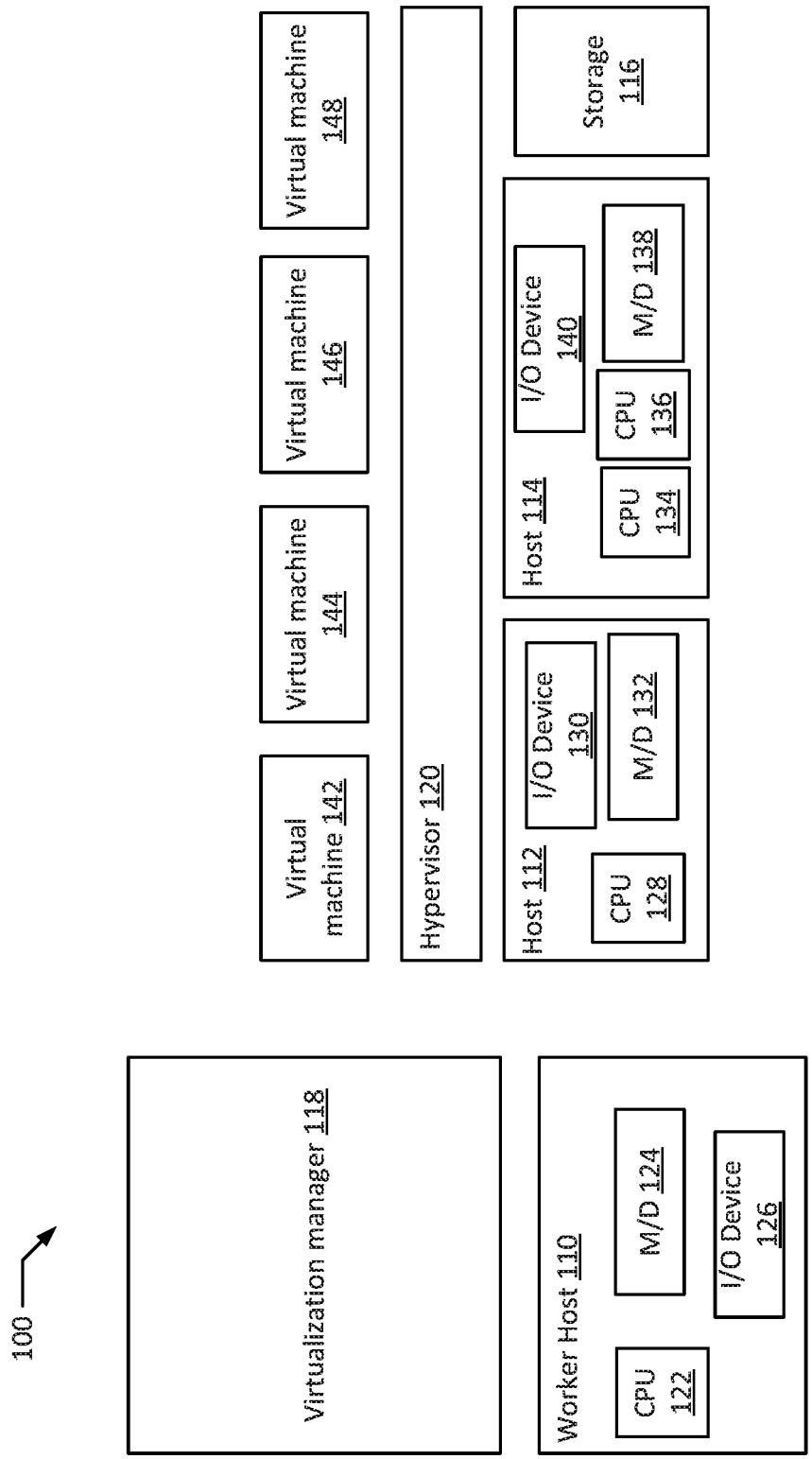
FIG. 1 is a block diagram of an example system according to an example of the present disclosure.

FIG. 1 depicts a high-level component diagram of an example system 100 for different availability and performance requirements. For example, the system 100 may include worker host 110, and hosts 112, and 114 and storage 116. Worker host 110 may include CPU 122, memory device ("M/D") 124, and input/output device ("I/O") 126. Host 112 may include CPU 128, I/O device 130, and M/D 132. Host 114 may include CPUs 134 and 136, I/O device 140 and M/D 138. The system further includes hypervisor 120, virtualization manager 118 and virtual machines 142, 144, 146, and 148. In an example, the virtualization manager 118 directs the worker host 110, and hosts 112 and 114 in order to gradually create a server virtual machine.

As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the system 100 may be distributed over multiple processors, memories, and networks.

Further, system 100 may also include an input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.). For example, the I/O devices 126, 130, and 140 may be coupled to a processor.

Figure 2:
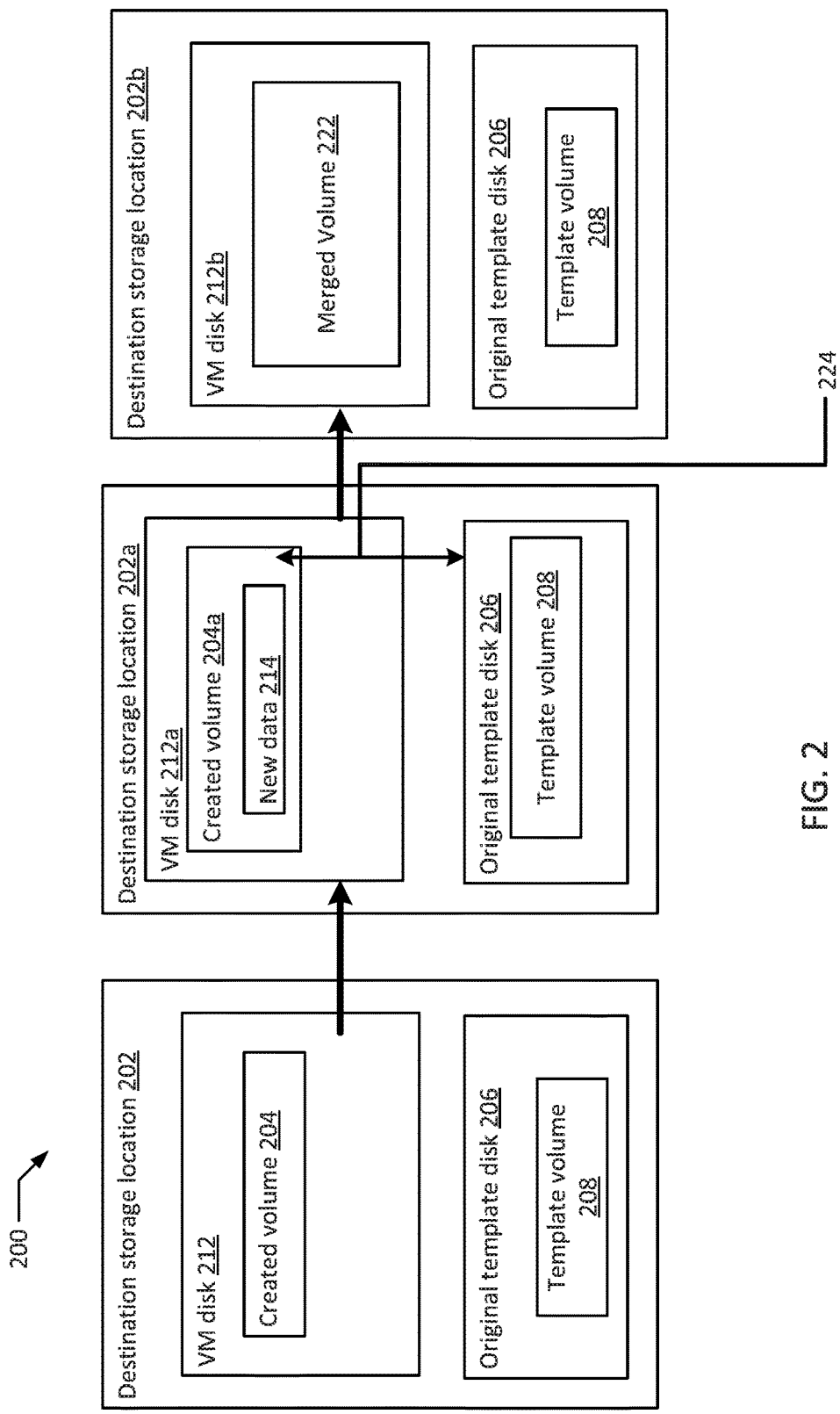
FIG. 2 is a block diagram of an example system over time according to an example of the present disclosure.

FIG. 2 is a block diagram of an example system over time according to an example of the present disclosure. The system 200 includes horizontal arrows that indicate a flow of time between three different time periods from left to right. The system 200 includes at a first time period configuration of a destination storage location 202. The destination storage location 202 contains a virtual machine disk ("VM disk") 212 and an original template disk 206. The VM disk 212 includes a created volume 204. The original template disk 206 includes a template volume 208. The original template disk 206 may be located in every storage location, such as destination storage location 202, or may be located in a shared storage location. Further, every VM disk, such as VM disk 212, may optionally include a template volume, such as template volume 208. In an example, the created volume 204 is based on (on top of) the template volume 208.

The system 200 includes a configuration of the destination storage location 202a at a second time period. The destination storage location 202a includes a VM disk 212a and an original template disk 206. The VM disk 212a includes a created volume 204a. The created volume 204a includes new data 214. The VM disk 212a is similar to VM disk 212, but includes new data 214 in created volume 204a. The original template disk 206 includes a template volume 208. Vertical arrow 224 indicates that the original template disk 206, or template volume 208, is merged with created volume 204a to become merged volume 222 in the next time period.

The system 200 includes a configuration of the destination storage location 202b at a third time period. The destination storage location 202b includes a VM disk 212b which includes the merged volume 222. The destination storage location 202b further includes an original template disk 206, which contains a template volume 208.

Figure 3:
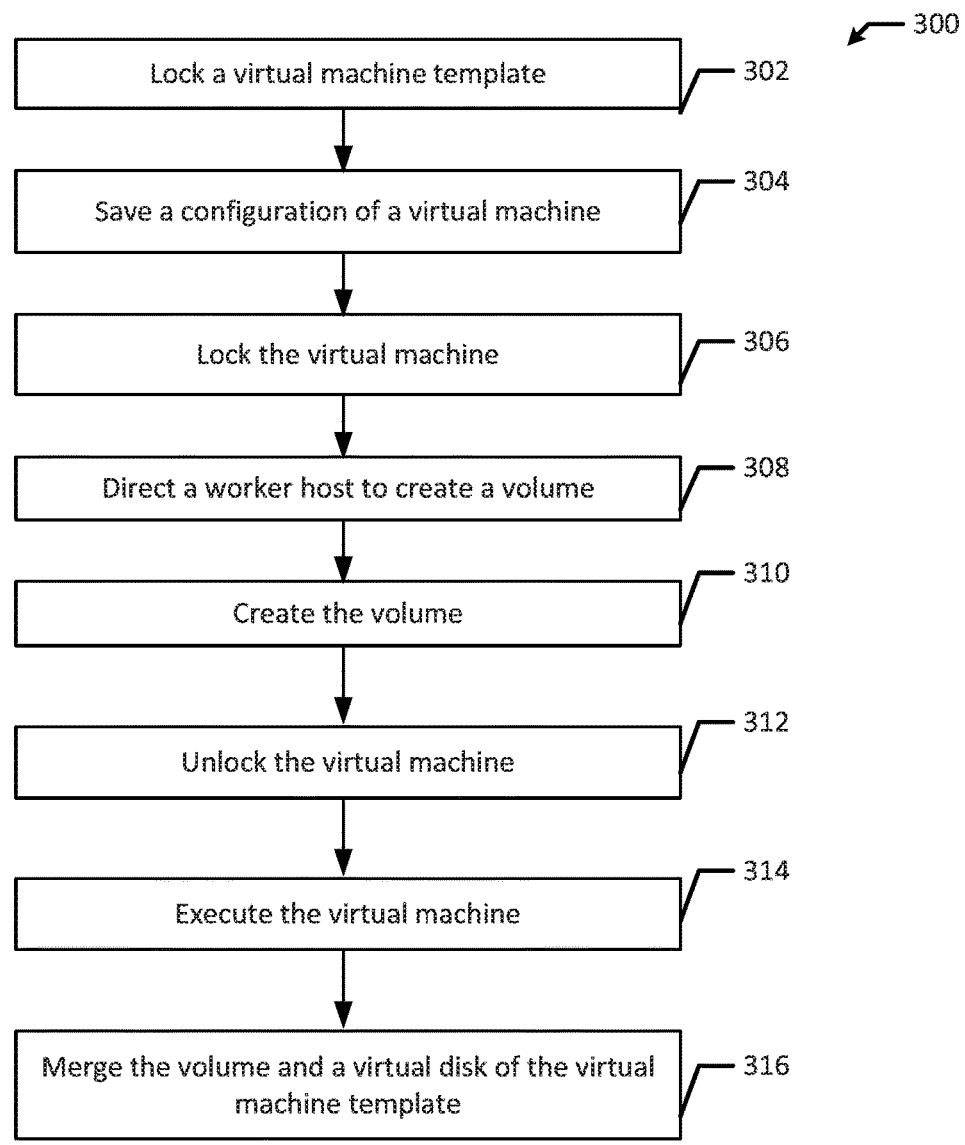
FIG. 3 is a flowchart illustrating an example method for a gradual creation process of server virtual machines according to an example of the present disclosure.

FIG. 3 is a flowchart illustrating an example method 300 for the gradual creation process of server virtual machines. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

The method 300 begins with a virtualization manager locking a virtual machine template (block 302). For example, a virtualization manager 118 locks a virtual machine template 208 located in a destination storage location 202. In the example, locking the virtual machine template 208 will prevent the virtual machine template 208 from being modified or deleted. In an example, the destination storage location 202 may be the host 112. In an alternative example, destination storage location 202 may not be a host, but rather an alternative storage device or location.

Next, the virtualization manager saves a configuration of a virtual machine (block 304). For example, the virtualization manager 118 saves a configuration of virtual machine 142. The virtualization manager locks the virtual machine (block 306). For example, virtualization manager 118 locks virtual machine 142 simultaneously when saving the configuration of virtual machine 142. In the example, saving and locking the virtual machine 142 prevents the virtual machine 142 from being executed, modified or deleted.

Next, the virtualization manager directs a worker host to create a volume (block 308). For example, the virtualization manager 118 directs a worker host 110 to create a created volume 204 in the VM disk 212. Based on this instruction, the worker host creates the volume (block 310). For example, the worker host 110 creates created volume 204. In the example, the created volume 204 is used to store new written data, such as new data 214 in FIG. 2. The new data 214 in FIG. 2 includes the differences between the created volume 204 and the original template disk 206. These differences, for example, include only the sections of data that were modified with newer data compared to the original template disk 206 (i.e., data that has not been written since the created volume 204 was created). In the example, the created volume 204 can be any type of copy on write volume, such as a QCOW volume.

Next, the virtualization manager unlocks the virtual machine (block 312). For example, the virtualization manager 118 unlocks the virtual machine 142 upon completion of created volume 204. Either simultaneously or sequentially, the destination host executes the virtual machine (block 314). For example, the destination storage location 202 executes the virtual machine, and from this point, a user can run the newly created virtual machine on destination storage location 202.

Next, the worker host merges the volume and a virtual machine template (block 316). For example, the worker host 110 merges the original template disk 206 with created volume 204a to create a merged volume 222. In an example, the merger of the original template disk 206 and the created volume 204a is undetectable to a guest operating system and/or a user, and detaches the new virtual machine from original template disk 206. Further, the merger of the original template disk 206 and the created volume 204a leaves the original template disk 206 unmodified. In an example, prior to merging the original template disk 206 with the created volume 204a, the virtualization manager 118 may instruct the worker host 110 to merge the created volume 204a and the original template disk 206. This instruction by the virtualization manager 118 may be automatic, or may be prompted by an external event.

In an alternative example, prior to merging original template disk 206 with created volume 204a, the virtualization manger 118 may monitor the use of the created volume 204a, and may only instruct the worker host 110 to merge the original template disk 206 with the created volume 204a if the level of activity of the volume 204a has reached a low threshold level of activity. For example, if the created volume 204a is not being used often, and reaches a state of idle or close to idle, then the virtualization manager 118 may direct the worker host 110 to begin merging the original template disk 206 with the created volume 204a. In an alternative example, the lower threshold level does not need to be near idle. Rather, in the alternative example, the lower threshold level of activity may be predetermined by an administrator.

In an alternative example, prior to merging the original template disk 206 with the created volume 204a, the virtualization manager 118 instructs the worker host 110 to merge the created volume 204a and the original template disk 206 when the virtualization manager 118 receives a request from a user.

In an alternative example, prior to merging the original template disk 206 with the created volume 204a, an administrator will preset a predefined time for merging the created volume 204a and the original template disk 206. For example, at the predefined time, the virtualization manager 118 instructs the worker host 110 to merge the original template disk 206 and the created volume 204a.

Figure 4:
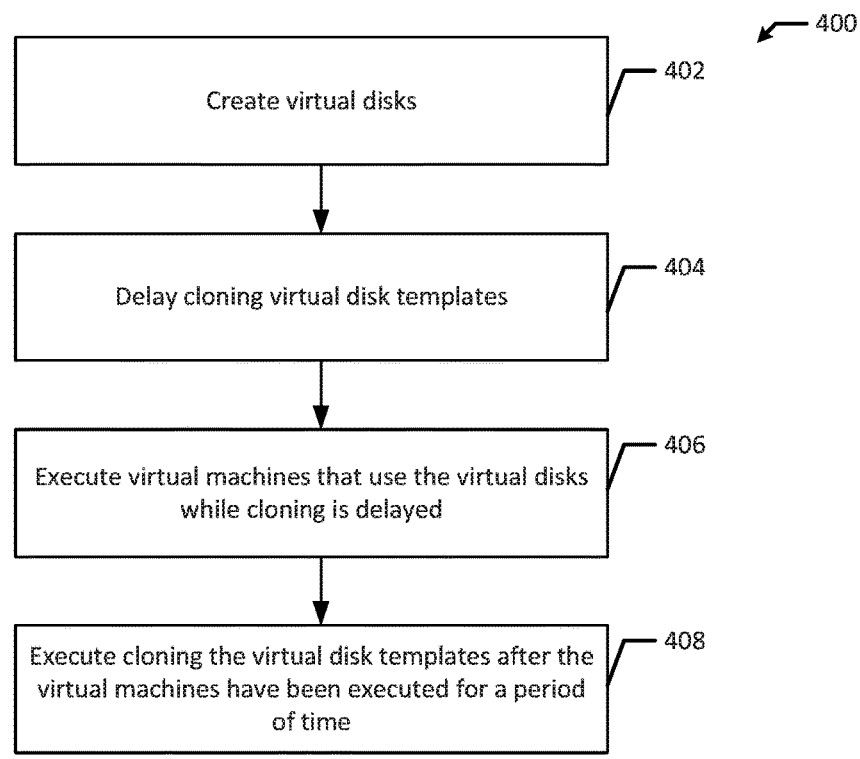
FIG. 4 is a flowchart illustrating an example method for a gradual creation process of a pool of server virtual machines according to an example of the present disclosure.

FIG. 4 is a flowchart illustrating an example method 400 for the gradual creation process of a pool of server virtual machines. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

The method 400 begins by creating virtual disks (block 402). For example, a pool of many VM disks, such as VM disk 212, is created. Each of these virtual disks in the pool, such as VM disk 212, includes a plurality of volumes, such as volume 204 in VM disk 212.

Next, the method 400 includes delaying the cloning of virtual disk templates (block 404). For example, once VM disk 212 is created, the contents of original template disk 206 are not immediately cloned, but rather, are intentionally delayed from cloning.

Next, virtual machines that use the virtual disks are executed while the cloning is delayed (block 406). For example, virtual machine 144 may be executed while cloning is delayed. After being executed, the volumes, such as the created volume 204, may store data, such as data 214. Therefore, created volume 204a is the created volume with data stored inside. In the example, the pool of VM disks is operational while the delay of cloning the original template disk 206 is ongoing.

Next, cloning of the virtual disk templates is executed after the virtual machines have been executed for a period of time (block 408). For example, the original template disk 206 is cloned, and the differences between the original template disk 206 and the created volume 204a are merged and stored into a merged volume 222. In an alternate example, a plurality of snapshot volumes may be created after the cloning process is executed. In an example, the cloning of the original template disk 206 and merger with each volume, such as volume 204a, may occur automatically, or in response to an external event. For example, a user may request the cloning process to occur for each virtual machine or all virtual machines either sequentially or simultaneously, and therefore, the cloning and merger will only occur when requested by a user. In this example, the user may control each virtual machine's cloning individually. In an alternate example, a user may request the cloning process to occur, and the cloning of the virtual machines occurs sequentially for all virtual machines without a specific user instruction for each virtual machine. In an alternate example, when a virtual machine of the plurality of virtual machines as reached a low level of activity, a threshold predetermined by an administrator or calculated by the virtualization manager, the cloning and merger may begin for each virtual machine. In an alternate example, cloning and merger for each virtual machine may occur at a predetermined time. In an example, there may be one predetermined time for all virtual machines, or a different predetermined time for each virtual machine.

Figure 5A:
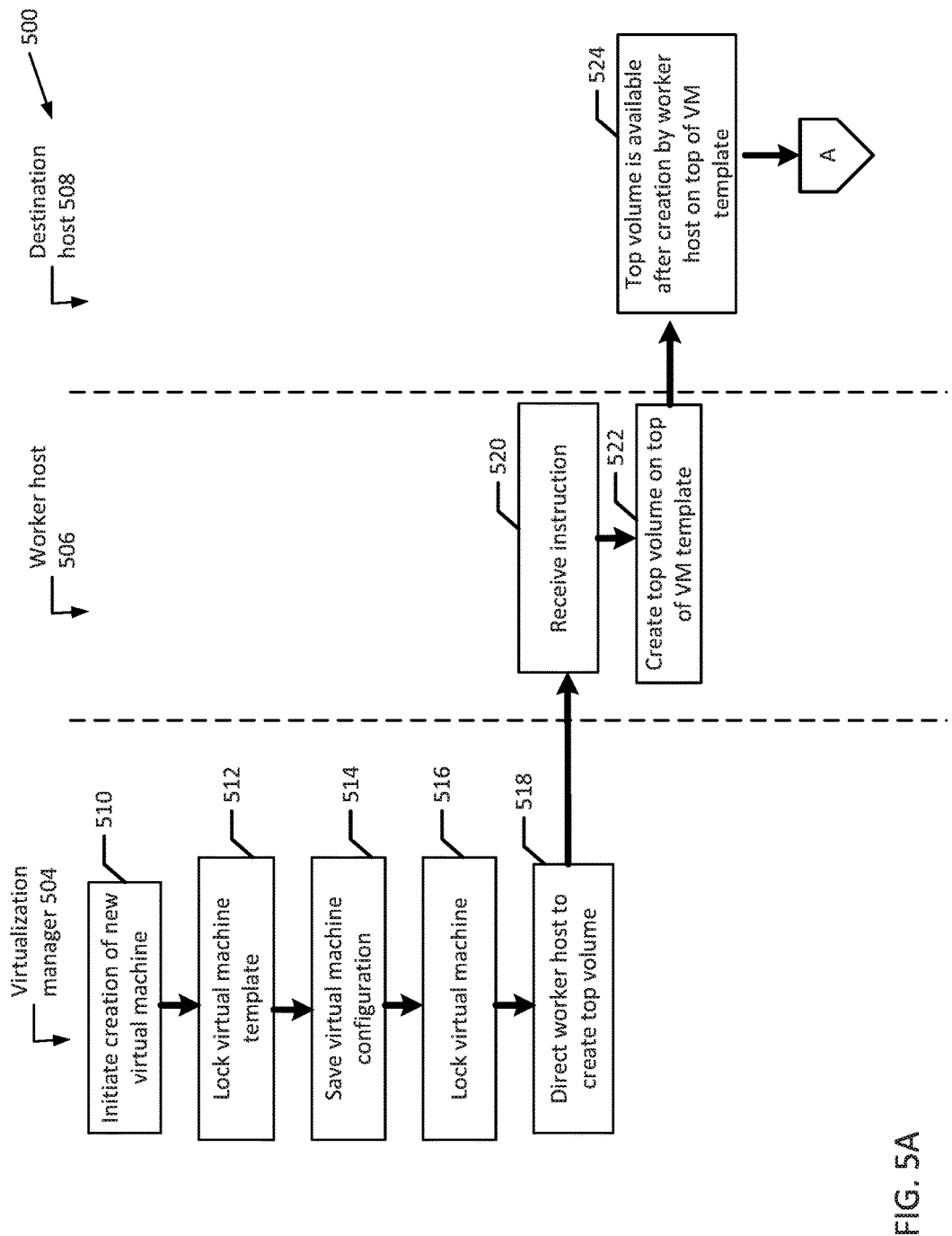
FIGS. 5A to 5B are a flow diagram illustrating example methods of a gradual creation process of server virtual machines according to an example of the present disclosure.
Figure 5B:
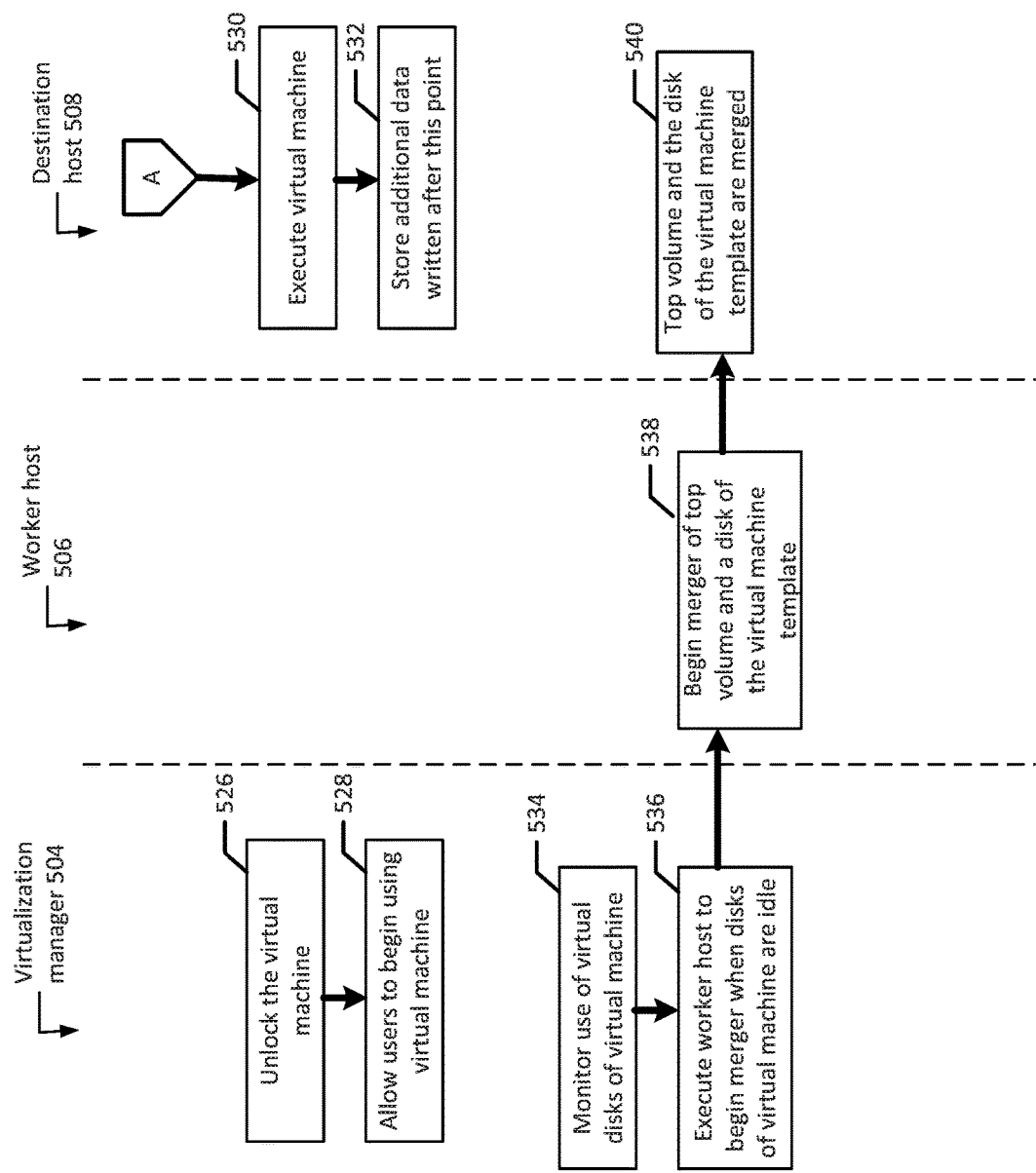

FIGS. 5A to 5B illustrate a flowchart of an example method 500 for a gradual creation process of server virtual machines. Although the example method 500 is described with reference to the flowchart illustrated in FIGS. 5A to 5B, it will be appreciated that many other methods of performing the acts associated with the method may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both. For example, the method 500 may be performed by a system including a virtualization manager 504, a worker host 506, and a destination host 508.

In the illustrated example, a virtualization manager 504 initiates the creation of a new virtual machine to be located at destination host 508 (block 510). The virtualization manager 504 locks a virtual machine template (block 512). For example, the lock is a logical lock. Next, the virtualization manager 504 saves a virtual machine's configuration (block 514), and locks the virtual machine (block 516). The virtualization manager 504 locks the virtual machine and saves the virtual machine's configuration either simultaneously or consecutively. The virtualization manager 504 then directs the worker host 506 to create a top volume on top of a virtual machine template (block 518). Worker host 506 receives the instruction from virtualization manager 504 (block 520), and creates the top volume on top of the virtual machine template (block 522). After the top volume is created by worker host 506, it is available at the destination host 508 on top of the virtual machine template (block 524).

Next, the destination host 508 executes the virtual machine (block 530) and stores any additional data written to the top volume (bock 532). In an alternative example, the virtualization manager 504 may also execute the virtual machine. Either simultaneously or consecutively, the virtualization manager 504 unlocks the virtual machine (block 526). Then the virtualization manager 504 allows users to begin using the virtual machine (block 528). In an example, while reading data, the data is read first from the top volume that was created. If the volume does not include the needed data, the needed data is sought from the virtual machine template.

Next, the virtualization manager 504 monitors use of the virtual disks of the virtual machine (block 534). Alternatively, the virtualization manager 504 may monitor the use of the top volume. Then, the virtualization manager 504 executes the worker host 506 to begin a merger of the top volume and a disk of the virtual machine template when virtualization manager determines that the virtual disks of the virtual machines are idle (block 536). Next, the worker host 506 begins the merger of the top volume and a disk of the virtual machine template (block 538). The top volume and the disk of the virtual machine template are merged and available at the destination host 508 (block 540). In an alternate example, responsive to merging the top volume and the disk of the virtual machine template, the virtualization manger 504 unlocks the virtual machine template. In an example, the virtual machine can be executed or continue to be used during the merge operation.

Figure 6:
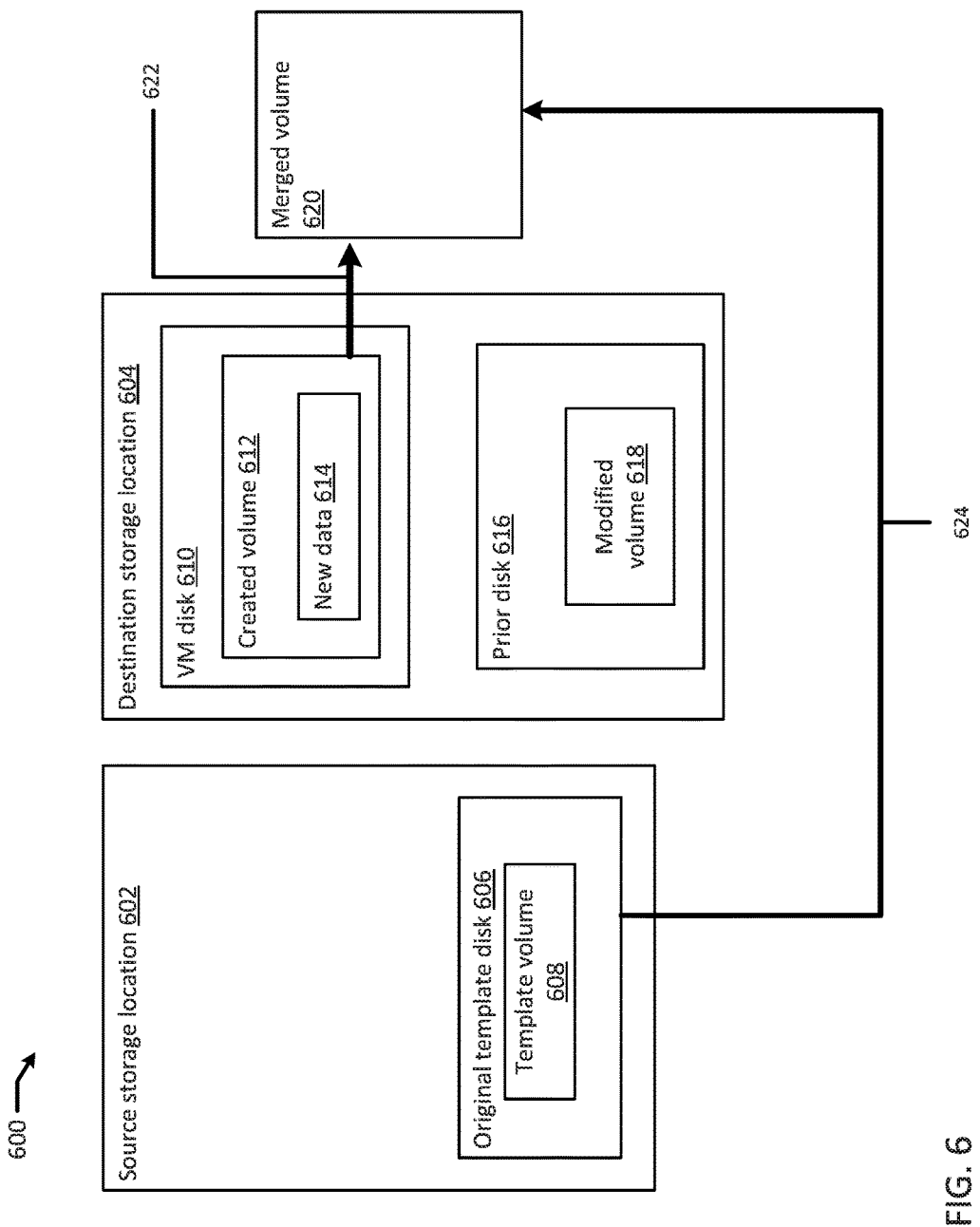
FIG. 6 is a block diagram of a system over time according to an example of the present disclosure.

FIG. 6 is a block diagram of an example system over time according to an example of the present disclosure. As illustrated in FIG. 6, an example system 600 may include at a first time a source storage location 602 and a destination storage location 604. The source storage location 602 includes an original template disk 606. The original template disk 606 includes a template volume 608.

Destination storage location 604 includes a VM disk 610 and a prior disk 616. The prior disk 616 contains modified volume 618. The VM disk 610 includes a created volume 612. The created volume 612 stores new data 614. In example system 600, at a second time, the created volume 612 and the original template disk 606 are merged together as indicated by arrows 624 and 622 and exist on destination storage location 604 as a merged volume 620.

Figure 7:
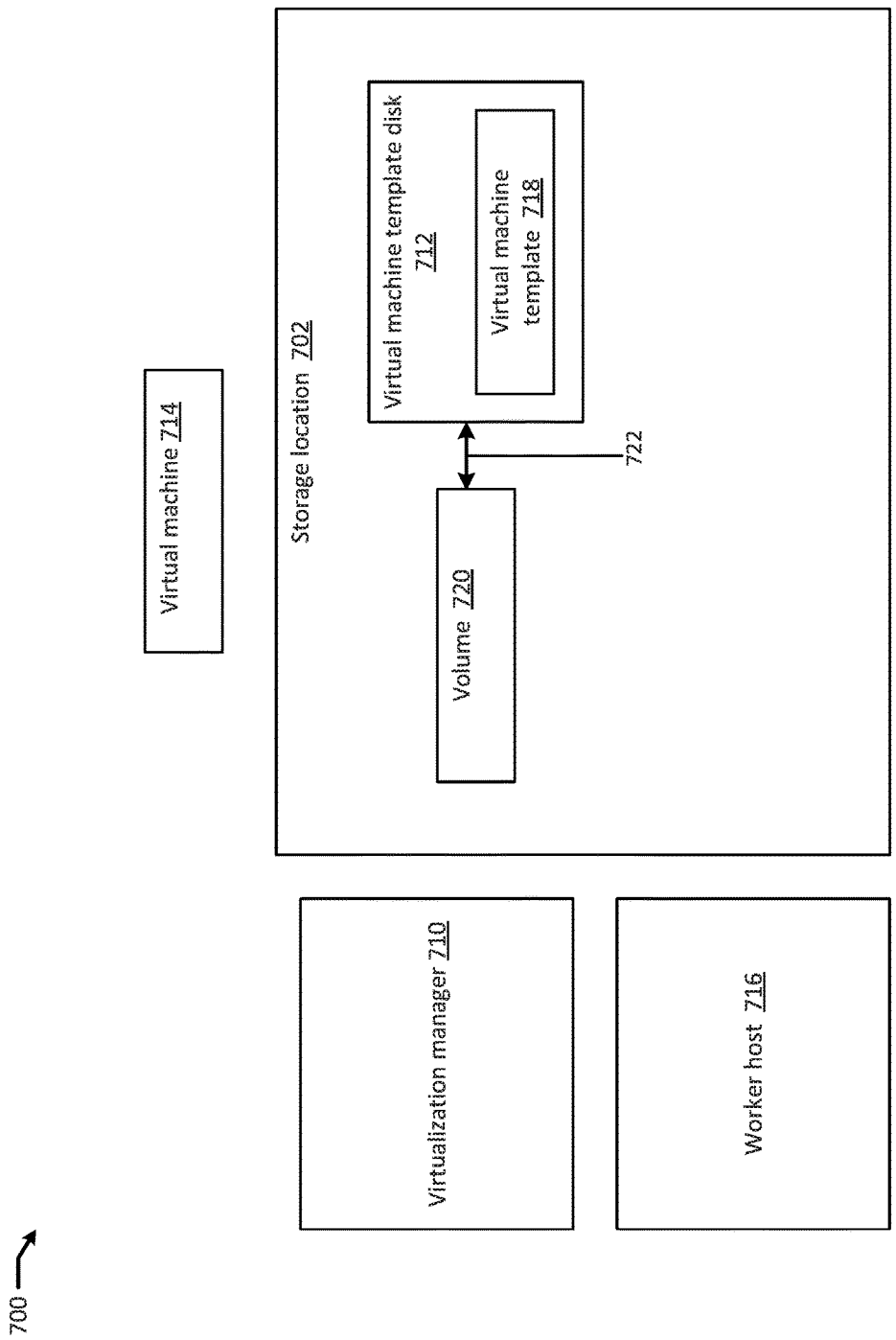
FIG. 7 is a block diagram of a system according to an example of the present disclosure.

FIG. 7 is a block diagram of an example system 700 according to an example of the present disclosure. The example system 700 includes a virtualization manager 710, a worker host 716, a virtual machine 714, and a storage location 702. The storage location 702 includes a volume 720 and a virtual machine template disk 712. The virtual machine template disk 712 includes a virtual machine template 718. The arrow 722 indicates that the volume 720 and the virtual machine template disk 712 are configured to be merged.

Figure 8:
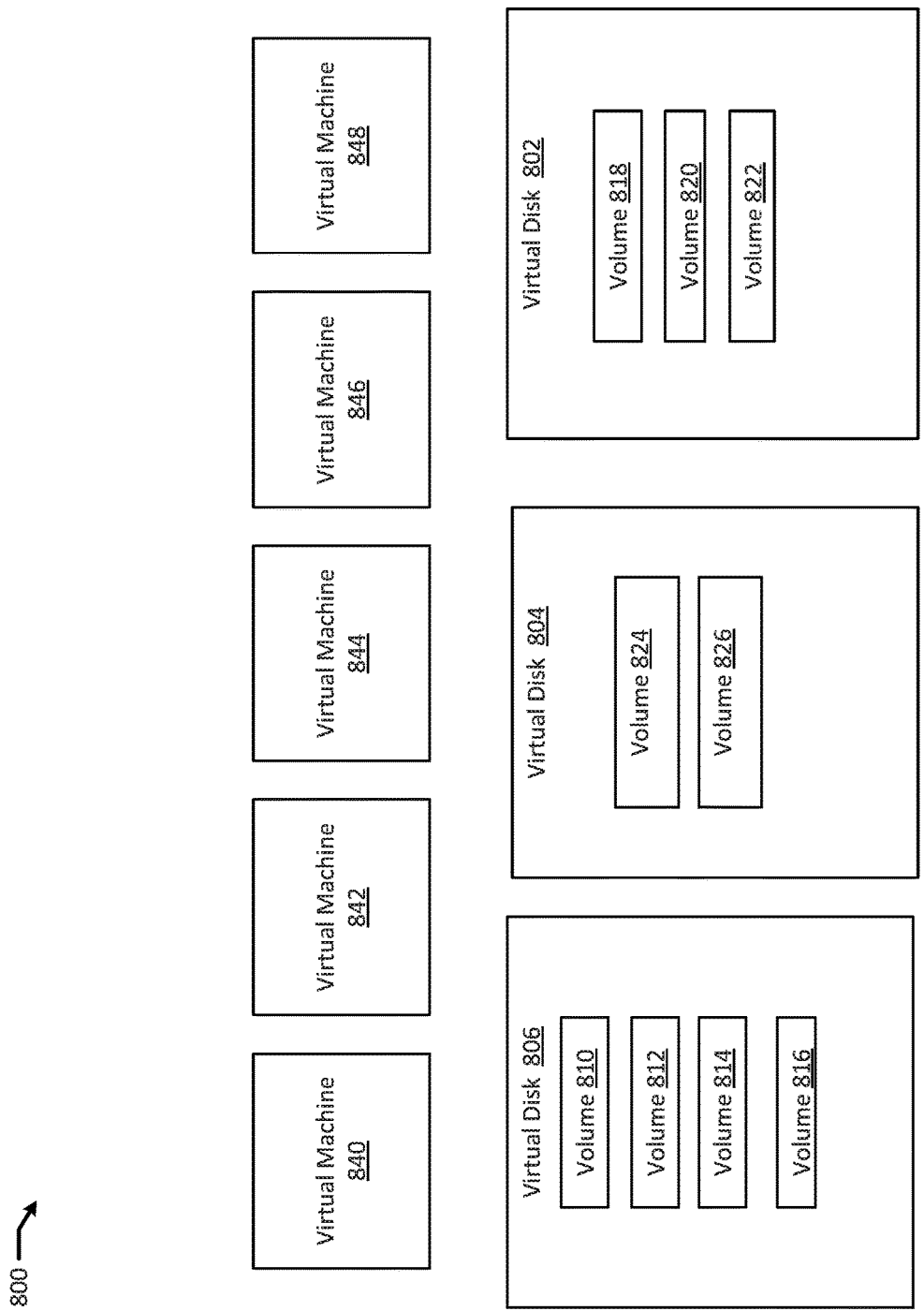
FIG. 8 is a block diagram of a system according to an example of the present disclosure.

FIG. 8 is a block diagram of an example system 800 according to an example of the present disclosure. The example system 800 includes virtual disks 802, 804, and 806. The example system 800 further includes virtual machines 840, 842, 844, 846, and 848. The virtual disk 806 includes volumes 810, 812, 814, and 816. The virtual disk 804 includes volumes 824, 826. The virtual disk 802 includes volumes 818, 820, 822. In an example, any of virtual disks 802, 804, and 806 may have one or more virtual disk templates.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a method of creating a virtual machine. The method includes a virtualization manager locking a configuration of a virtual machine template, saving a configuration of a virtual machine, locking the virtual machine, and directing a worker host to create a volume. The worker host creates the volume, and the virtualization manager locks the virtual machine. A destination host executes the virtual machine, and the worker host merges the volume and a disk of the virtual machine template.

In accordance with a 2nd exemplary aspect of the present disclosure, which may be used in combination with any one or more of the preceding aspects (e.g., the 1st aspect), prior to merging the volume an the disk of the virtual machine template, the virtualization manager instructs the worker host to merge the volume and the disk of the virtual machine template.

In accordance with a 3rdexemplary aspect of the present disclosure, which may be used in combination with any one or more of the preceding aspects (e.g., the 2nd aspect), the virtualization manager monitors the use of the volume and instructs the worker host to merge the volume and the disk of the virtual machine template after the volume and the disk of the virtual machine template have reached a threshold level.

In accordance with a 4th exemplary aspect of the present disclosure, which may be used in combination with any one or more of the preceding aspects (e.g., the 2nd aspect), the virtualization manager instructs the worker host to merge the volume and the disk of the virtual machine template upon a request from a user.

In accordance with a 5th exemplary aspect of the present disclosure, which may be used in combination with any one or more of the preceding aspects (e.g., the 2nd aspect), presetting a predefined time for merging the volume and the disk of the virtual machine template, and the virtualization manager instructing the worker host to merge the volume and the disk of the virtual machine template at the predefined time.

In accordance with a 6th exemplary aspect of the present disclosure, which may be used in combination with any one or more of the preceding aspects (e.g., the 1st aspect), prior to merging the volume and the disk of the virtual machine template, the virtualization manager instructs the worker host to merge the volume and the disk of the virtual machine template immediately after unlocking the virtual machine.

In accordance with a 7th exemplary aspect of the present disclosure, which may be used in combination with any one or more of the preceding aspects (e.g., the 1st aspect), prior to merging the volume and the disk of the virtual machine template, copying differences between the volume and the disk of the virtual machine template, and storing the differences in the volume.

In accordance with an 8th exemplary aspect of the present disclosure, which may be used in combination with any one or more of the preceding aspects (e.g., the 7th aspect), where the disk of the virtual machine template remains unmodified.

In accordance with a 9th exemplary aspect of the present disclosure, which may be used in combination with any one or more of the preceding aspects (e.g., the 1st aspect), where merging the volume and the disk of the virtual machine template is undetectable to a user.

In accordance with a 10th exemplary aspect of the present disclosure, which may be used in combination with any one or more of the preceding aspects (e.g., the 1st aspect), where merging the volume and the disk of the virtual machine template is undetectable to a guest operating system.

In accordance with a 11th exemplary aspect of the present disclosure, which may be used in combination with any one or more of the preceding aspects (e.g., the 1st aspect), where the virtual machine template is prevented from being at least one of modified and deleted by the virtualization manager locking the virtual machine template.

In accordance with a 12th exemplary aspect of the present disclosure, which may be used in combination with any one or more of the preceding aspects (e.g., the 1st aspect), where the virtual machine is prevented from being at least one of executed, modified, and deleted by the virtualization manager locking the virtual machine.

In accordance with a 13th exemplary aspect of the present disclosure, which may be used in combination with any one or more of the preceding aspects (e.g., the 1st aspect), where the volume stores new written data.

In accordance with a 14th exemplary aspect of the present disclosure, which may be used in combination with any one or more of the preceding aspects (e.g., the 1st aspect), responsive to unlocking the virtual machine, a user runs the virtual machine.

In accordance with a 15th exemplary aspect of the present disclosure, which may be used in combination with any one or more of the preceding aspects (e.g., the 1st aspect), responsive to merging the volume and the disk of the virtual machine template, the virtualization manager unlocks the virtual machine template.

In accordance with a 16th exemplary aspect of the present disclosure, which may be used in combination with any one or more of the preceding aspects (e.g., the 1st aspect), where merging the volume and the disk of the virtual machine template detaches the virtual machine from the virtual machine template.

In accordance with a 17th exemplary aspect of the present disclosure, which may be used in combination with any one or more of the preceding aspects (e.g., the 1st aspect), where the disk of the virtual machine is located in a destination storage location.

In accordance with an 18th exemplary aspect of the present disclosure, which may be used in combination with any one or more of the preceding aspects (e.g., the 17th aspect), where the destination storage location contains virtual machine snapshots.

Aspects of the subject matter described herein may be useful alone or in combination with one or more other aspects described herein. In a 19th exemplary aspect of the present disclosure a system includes one or more storage locations and a virtualization manager. The virtualization manager locks a virtual machine template, saves a configuration of a virtual machine, locks the virtual machine, directs a worker host to create a volume, and unlocks the virtual machine. A destination host executes the virtual machine. The worker host creates the volume and merges the volume and a disk of the virtual machine template.

Aspects of the subject matter described herein may be useful alone or in combination with one or more other aspects described herein. In a 20th exemplary aspect of the present disclosure a non-transitory machine-readable medium stores code, which when executed by a processor, is configured to cause a virtualization manger to lock a virtual machine template, save a configuration of a virtual machine, lock the virtual machine, and direct a worker host to create a volume. Additionally, the non-transitory machine-readable medium is configured to cause the worker host to create the volume, the virtualization manager to unlock the virtual machine, a destination host to execute the virtual machine, and the worker host to merge the volume and a disk of the virtual machine template.

Aspects of the subject matter described herein may be useful alone or in combination with one or more other aspects described herein. In a 21st exemplary aspect of the present disclosure a method of creating a pool of server virtual machine. The method includes creating virtual disks, wherein each disk of the virtual disks includes volumes. The cloning process of virtual disk templates is delayed, and virtual machines using the virtual disks are executed while the cloning process is delayed. After the virtual machines have executed for a period of time, the cloning process of the virtual disk templates is executed.

In accordance with a 22nd exemplary aspect of the present disclosure, which may be used in combination with any one or more of the preceding aspects (e.g., the 21st aspect), where a snapshot volumes are created after the cloning process is executed.

In accordance with a 23rd exemplary aspect of the present disclosure, which may be used in combination with any one or more of the preceding aspects (e.g., the 21st aspect), a virtualization manager monitors each virtual machine to determine when each virtual machine has reached a threshold state.

In accordance with a 24th exemplary aspect of the present disclosure, which may be used in combination with any one or more of the preceding aspects (e.g., the 23rd aspect), performing the cloning process on each virtual machine when each respective virtual machine has reached the threshold state.

In accordance with a 25th exemplary aspect of the present disclosure, which may be used in combination with any one or more of the preceding aspects (e.g., the 21st aspect), a virtualization manager receives a request to perform the cloning process for each virtual machine from a user, and performing the cloning process on each respective virtual machine when requested by the user.

In accordance with a 26th exemplary aspect of the present disclosure, which may be used in combination with any one or more of the preceding aspects (e.g., the 21st aspect), presetting a predetermined time for performing the cloning process for each virtual machine, and performing the cloning process on each respective virtual machine at the predetermined time.

In accordance with a 27th exemplary aspect of the present disclosure, which may be used in combination with any one or more of the preceding aspects (e.g., the 21st aspect), the cloning process of the plurality of virtual disks including a virtualization manager locking a virtual machine template, saving a configuration of a virtual machine, locking the virtual machine, directing a worker host to create a volume for each disk, and unlocking the virtual machine. A destination host executes the virtual machine.

In accordance with a 28th exemplary aspect of the present disclosure, which may be used in combination with any one or more of the preceding aspects (e.g., the 26th aspect), the worker host creating the volume for each disk.

In accordance with a 29th exemplary aspect of the present disclosure, which may be used in combination with any one or more of the preceding aspects (e.g., the 27th aspect), where each disk includes the virtual machine template.

In accordance with a 30th exemplary aspect of the present disclosure, which may be used in combination with any one or more of the preceding aspects (e.g., the 28th aspect), the worker host merging the virtual machine template for each disk and the volume for each disk.

In accordance with a 31st exemplary aspect of the present disclosure, which may be used in combination with any one or more of the preceding aspects (e.g., the 29th aspect), where the virtual machine template remains unmodified.

In accordance with a 32nd exemplary aspect of the present disclosure, which may be used in combination with any one or more of the preceding aspects (e.g., the 29th aspect), where merging the virtual machine template for each disk and the volume for each disk is undetectable to a user.

In accordance with a 33rd exemplary aspect of the present disclosure, which may be used in combination with any one or more of the preceding aspects (e.g., the 29th aspect), where merging the virtual machine template for each disk and the volume for each disk is undetectable to a guest operating system.

In accordance with a 34th exemplary aspect of the present disclosure, which may be used in combination with any one or more of the preceding aspects (e.g., the 29th aspect), where merging the virtual machine template for each disk and the volume for each disk detaches the virtual machines from the virtual machine template for each disk.

In accordance with a 35th exemplary aspect of the present disclosure, which may be used in combination with any one or more of the preceding aspects (e.g., the 26th aspect), where the virtual machine template is prevented from being at least one of modified and deleted by the virtualization manager locking the virtual machine template.

In accordance with a 36th exemplary aspect of the present disclosure, which may be used in combination with any one or more of the preceding aspects (e.g., the 26th aspect), wherein the virtual machine is prevented from being at least one of executed, modified, and deleted by the virtualization manager locking the virtual machine.

In accordance with a 37th exemplary aspect of the present disclosure, which may be used in combination with any one or more of the preceding aspects (e.g., the 26th aspect), where the volume stores new written data.

Aspects of the subject matter described herein may be useful alone or in combination with one or more other aspects described herein. In a 38th exemplary aspect of the present disclosure a system includes one or ore storage locations. The one or ore storage locations create virtual disks, where each disk includes volumes, delay a cloning process of virtual disk templates, execute virtual machines using the virtual disks while the cloning process is being delayed, and execute the cloning process of the virtual disk templates after the virtual machines have executed for a period of time.

Aspects of the subject matter described herein may be useful alone or in combination with one or more other aspects described herein. In a 39th exemplary aspect of the present disclosure a non-transitory machine-readable medium stores code, which when executed by a processor, is configured to create a plurality of virtual disks, where each disk includes volumes, delay a cloning process of virtual disk templates, execute virtual machines using the virtual disks while the cloning process is being delayed, and execute the cloning process of the virtual disk templates after the plurality of virtual machines have executed for a period of time.

Aspects of the subject matter described herein may be useful alone or in combination with one or more other aspects described herein. In a 40th exemplary aspect of the present disclosure a system includes a means for a virtualization manager to lock a virtual machine template, save a configuration of a virtual machine, lock the virtual machine, and direct a worker host to create a volume. The aspect further includes a means for a worker host to create the volume, and the virtualization manager to unlock the virtual machine. The aspect further includes a means for a destination host to execute the virtual machine, and the worker host to merge the volume and a disk of the virtual machine template.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of creating a virtual machine, the method comprising:
   locking, by a virtualization manager, a virtual machine template;
   saving, by the virtualization manager, a configuration of a virtual machine;
   locking, by the virtualization manager, the virtual machine;
   directing, by the virtualization manager, a worker host to create a volume;

creating, by the worker host, the volume;
unlocking, by the virtualization manager, the virtual machine;
executing, by a destination host, the virtual machine; and
merging, by the worker host, the volume and a disk of the virtual machine template when the virtualization manager determines that the disk of the virtual machine is idle or near idle; and
responsive to merging the volume and the disk of the virtual machine template, unlocking, by the virtualization manager, the virtual machine template.

2. The method of claim 1, further comprising:
prior to merging the volume and the disk of the virtual machine template, instructing, by the virtualization manager, the worker host to merge the volume and the disk of the virtual machine template.

3. The method of claim 2, further comprising:
monitoring, by the virtualization manager, use of the volume; and
instructing, by the virtualization manager, the worker host to merge the volume and the disk of the virtual machine template after the volume and the disk of the virtual machine template have reached a threshold level.

4. The method of claim 2, further comprising:
instructing, by the virtualization manager, the worker host to merge the volume and the disk of the virtual machine template upon a request from a user.

5. The method of claim 2, further comprising:
presetting a predefined time for merging the volume and the disk of the virtual machine template; and
instructing, by the virtualization manager, the worker host to merge the volume and the disk of the virtual machine template at the predefined time.

6. The method of claim 1, further comprising:
prior to merging the volume and the disk of the virtual machine template, automatically instructing, by the virtualization manager, the worker host to merge the volume and the disk of the virtual machine template immediately after unlocking the virtual machine.

7. The method of claim 1, further comprising:
prior to merging the volume and the disk of the virtual machine template, copying differences between the volume and the disk of the virtual machine template; and
storing the differences in the volume.

8. The method of claim 7, wherein the disk of the virtual machine template remains unmodified.

9. The method of claim 1, wherein merging the volume and the disk of the virtual machine template is undetectable to a user.

10. The method of claim 1, wherein merging the volume and the disk of the virtual machine template is undetectable to a guest operating system.

11. The method of claim 1, wherein the virtual machine template is prevented from being at least one of modified and deleted by the virtualization manager locking the virtual machine template.

12. The method of claim 1, wherein the virtual machine is prevented from being at least one of executed, modified, and deleted by the virtualization manager locking the virtual machine.

13. The method of claim 1, wherein the volume stores new written data.

14. The method of claim 1, further comprising:
responsive to unlocking the virtual machine, running, by a user, the virtual machine.

15. The method of claim 1, wherein merging the volume and the disk of the virtual machine template detaches the virtual machine from the virtual machine template.

16. The method of claim 1, wherein the disk of the virtual machine is located in a destination storage location.

17. The method of claim 16, wherein the destination storage location contains virtual machine snapshots.

18. A system comprising:
one or more storage devices; and
a virtualization manager, wherein the virtualization manager:
locks a virtual machine template,
saves a configuration of a virtual machine,
locks the virtual machine,
directs a worker host to create a volume, and
unlocks the virtual machine,
wherein a destination host:
executes the virtual machine, and
wherein the worker host:
creates the volume, and
merges the volume and a disk of the virtual machine template when the virtualization manager determines that the disk of the virtual machine is idle or near idle; and
responsive to merging the volume and the disk of the virtual machine template, unlocking, by the virtualization manager, the virtual machine template.

19. A method of creating a pool of server virtual machines, the method comprising:
creating a plurality of virtual disks, wherein each disk of the plurality of virtual disks includes a plurality of volumes;
delaying a cloning process of a plurality of virtual disk templates;
locking the plurality of virtual disk templates;
executing a plurality of virtual machines using the plurality of virtual disks while the cloning process is being delayed;
executing the cloning process of the plurality of virtual disk templates after the plurality of virtual machines have executed for a period of time, including merging the plurality of virtual disks and the respective plurality of virtual disk templates when a virtualization manager determines that the respective virtual disks are idle or near idle; and
responsive to merging the plurality of virtual disks and the respective plurality of virtual disk templates, unlocking, by the virtualization manager, the respective virtual disk templates.

* * * * *